(12) United States Patent  (10) Patent No.: US 6,450,916 B2
Kamamura  (45) Date of Patent: Sep. 17, 2002

(54) CAM DISC OF LOADING CAM MECHANISM IN TOROIDAL TYPE CONTINUOUSLY VARIABLE TRANSMISSION AND MANUFACTURING METHOD THEREFOR

(75) Inventor: Yuko Kamamura, Hanyu (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/865,172

(22) Filed: May 24, 2001

(30) Foreign Application Priority Data

May 25, 2000 (JP) ......................... 2000-154888

(51) Int. Cl.$^7$ ............. F16H 15/38; B24B 1/00; B24B 5/26
(52) U.S. Cl. ............... 476/41; 29/558; 451/62; 476/40
(58) Field of Search ............ 74/567; 29/558; 451/62; 476/40, 41

(56) References Cited

U.S. PATENT DOCUMENTS 5,669,274 A    9/1997  Yokoi et al.
6,277,004 B1 * 8/2001  Matsumoto et al. ......... 451/11

FOREIGN PATENT DOCUMENTS

| JP | 8-61452 | 3/1986 |
| JP | 63-160740 | 7/1988 |
| JP | 1-37249 | 11/1989 |
| JP | 4-78358 | 7/1992 |
| JP | 11-201251 | 7/1999 |
| JP | 2000-61790 | 2/2000 |
| JP | 2000-65174 | 3/2000 |
| JP | 2000-202710 | 7/2000 |

* cited by examiner

Primary Examiner—Allan D. Herrmann
(74) Attorney, Agent, or Firm—Christensen O'Connor Johnson Kindness PLLC

(57) ABSTRACT

A loading cam mechanism of a toroidal type continuously variable transmission is provided with a cam disc that rotates together with an input shaft. A cam surface is formed on the cam disc. The cam disc includes a disc portion having the cam surface formed thereon and a cylindrical portion protruding from the central portion of the cam surface. The cam disc further includes a lathe-turned portion formed by lathe turning, a milled surface formed by means of an end mill, and a ground surface formed by means of a grindstone. Formed on a corner portion between the cylindrical portion and the disc portion are a first corner curved surface worked by means of an arcuate portion on the distal end portion of the end mill and a second corner curved surface worked by means of an arcuate portion on the distal end portion of the grindstone.

5 Claims, 3 Drawing Sheets

CAM DISC OF LOADING CAM MECHANISM IN TOROIDAL TYPE CONTINUOUSLY VARIABLE TRANSMISSION AND MANUFACTURING METHOD THEREFOR

CROSS-REFERENCE TO RELATED APPLICATIONS

This application is based upon and claims the benefit of priority from the prior Japanese Patent Application No. 2000-154888, filed May 25, 2000, the entire contents of which are incorporated herein by reference.

BACKGROUND OF THE INVENTION

The present invention relates to a toroidal type continuously variable transmission used as an automotive transmission, for example, and more specifically, to a cam disc of a loading cam mechanism therein.

Investigation is being made into the use of a half-toroidal type continuously variable transmission, such as the one described in Jpn. UM Appln. KOKAI Publication No. 62-71465, for a variator of an automotive transmission. As shown in FIG. 4, the continuously variable transmission of this type includes an input shaft 101, an input disc 102, an output shaft 103, an output disc 104, an adjustable-tilt displacement shaft 105, power rollers 106 rotatably supported on the displacement shaft 105, and the like. The rollers 106 are sandwiched between the input and output discs 102 and 104.

The respective opposite surfaces of the input and output discs 102 and 104 form concave surfaces or traction surfaces 102a and 104a with an arcuate profile. An outer peripheral surface 106a or spherical convex surface of each power roller 106 is in contact with the traction surfaces 102a and 104a. A loading cam mechanism 107 is located behind the input disc 102. The mechanism 107 includes a cam disc 108 having a first cam surface 109, a second cam surface 110 formed on the back of the input disc 102, and rollers 112. The rollers 112 are held in given positions between the cam surfaces 109 and 110 by means of a retainer 111. The cam surfaces 109 and 110 have their respective recesses P1 and projections P2 that are alternately arranged in the circumferential direction of the discs 108 and 102.

If the cam disc 108 rotates as the input shaft 101 is rotated by means of an engine (not shown), the relative positions of the cam surfaces 109 and 110 shift in the circumferential direction of the cam disc 108. As this is done, the discs 102 and 108 bind each other through the medium of the rollers 112 between the cam surfaces 109 and 110, whereupon torque is transmitted from the cam disc 108 to the input disc 102. When the input disc 102 rotates, its rotation is transmitted to the output disc 104 by means of the power rollers 106.

The transmission gear ratio of the output disc 104 to the input disc 102 can be changed by varying the tilt angles of the power rollers 106. Thus, a desired transmission gear ratio can be obtained by changing the ratio between the turning radius at the point of contact between each power roller 106 and the input disc 102 and the turning radius at the point of contact between each power roller 106 and the output disc 104, depending on the tilt angles of the power rollers 106.

As shown in FIG. 5, the cam disc 108 includes the cam surface 109 and a cylindrical portion 108a formed on the central portion of the disc 108. The cylindrical portion 108a projects toward the input disc 102. A clearance groove 108c for grinding is formed in a corner portion between the cam surface 109 and the cylindrical portion 108a. The groove 108c and the cam surface 109 are worked by cam lathe turning that is described in Jpn. Pat. Appln. KOKAI Publication No. 8-61452, for example. After the clearance groove 108c is formed, the cam surface 109 is milled with given accuracy by means of a milling machine.

If a bending load acts on the cam surface 109, however, stress concentrates on a region near the clearance groove 108c of the cam disc 108. This concentration of stress causes the strength of the cam disc 108 to lower. Further, the aforesaid lathe turning for the formation of the clearance groove 108c is required besides the milling work for finishing the cam surface 109 with high accuracy. Thus, the manufacture requires a lot of processes and entails high cost.

If the clearance groove 108c is formed in the cam disc 108, moreover, the retainer 111 for holding the rollers 112 may possibly be caught in the clearance groove 108c. If the retainer 111 is caught in the groove 108c, the rollers 112 are prevented from behaving normally. Accordingly, the loading cam mechanism 107 ceases to be able to generate a predetermined thrust, so that a gross slip or some other trouble may occur in some cases. If the input torque changes suddenly, in particular, the rollers 112 move on the cam surface 109 in a short time, so that the retainer 111 is easily caught in the clearance groove 108c.

BRIEF SUMMARY OF THE INVENTION

Accordingly, the object of the present invention is to provide a cam disc of a toroidal type continuously variable transmission designed so that concentration of stress on a corner portion between a disc portion and a cylindrical portion can be eased and that the number of working processes can be reduced.

A cam disc according to the invention comprises a disc portion having a cam surface formed thereon and a cylindrical portion protruding from the cam surface in the central portion of the disc portion, and further comprises a lathe-turned portion formed on a part of the cylindrical portion by lathe turning, a milled surface formed on a side face of the cylindrical portion by milling, and a ground surface including the cam surface and a corner curved surface with an arcuate profile formed on a corner portion between the cylindrical portion and the disc portion by grinding.

According to this invention, no clearance groove, such as the one used in a conventional cam disc, is formed in the corner portion between the disc portion and the cylindrical portion, concentration of stress on the corner portion can be eased, so that the strength of the cam disc can be enhanced. Since the corner portion is worked integrally with the side face of the cylindrical portion and the disc portion during the milling work, working processes can be made fewer than in the case of the conventional cam disc with a clearance groove. Since no clearance groove is formed in the corner portion, moreover, there is no possibility of a retainer being caught in a clearance groove.

The cam disc of this invention may comprise a first corner curved surface with an arcuate profile constituting a part of the milled surface and a second corner curved surface with an arcuate profile constituting a part of the ground surface, formed between the first corner curved surface and the cam surface, and having a radius of curvature not smaller than a given value.

A manufacturing method for a cam disc according to the present invention comprises a lathe turning process for lathe-turning at least an end portion of the cylindrical portion, a milling process for working a side face of the cylindrical portion and pre-finishing the cam surface by means of a milling tool, and further forming a first corner curved surface on a corner portion between the cylindrical portion and the disc portion by means of the milling tool, the milling process directly following the lathe turning process, and a grinding process for grinding the cam surface of the disc portion by means of a grindstone so that the first corner curved surface remains and forming a second corner curved surface between the first corner curved surface and the cam surface by means of the grindstone, the grinding process directly following the milling process.

The milling process is carried out by means of, for example, an end mill having an arcuate portion on the distal end portion thereof for working the first corner curved surface. Further, the grinding process is carried out by means of a grindstone having a straight portion for grinding the cam surface and an arcuate portion for grinding the second corner curved surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to FIGS. 1 to 3C.

Figure 2:
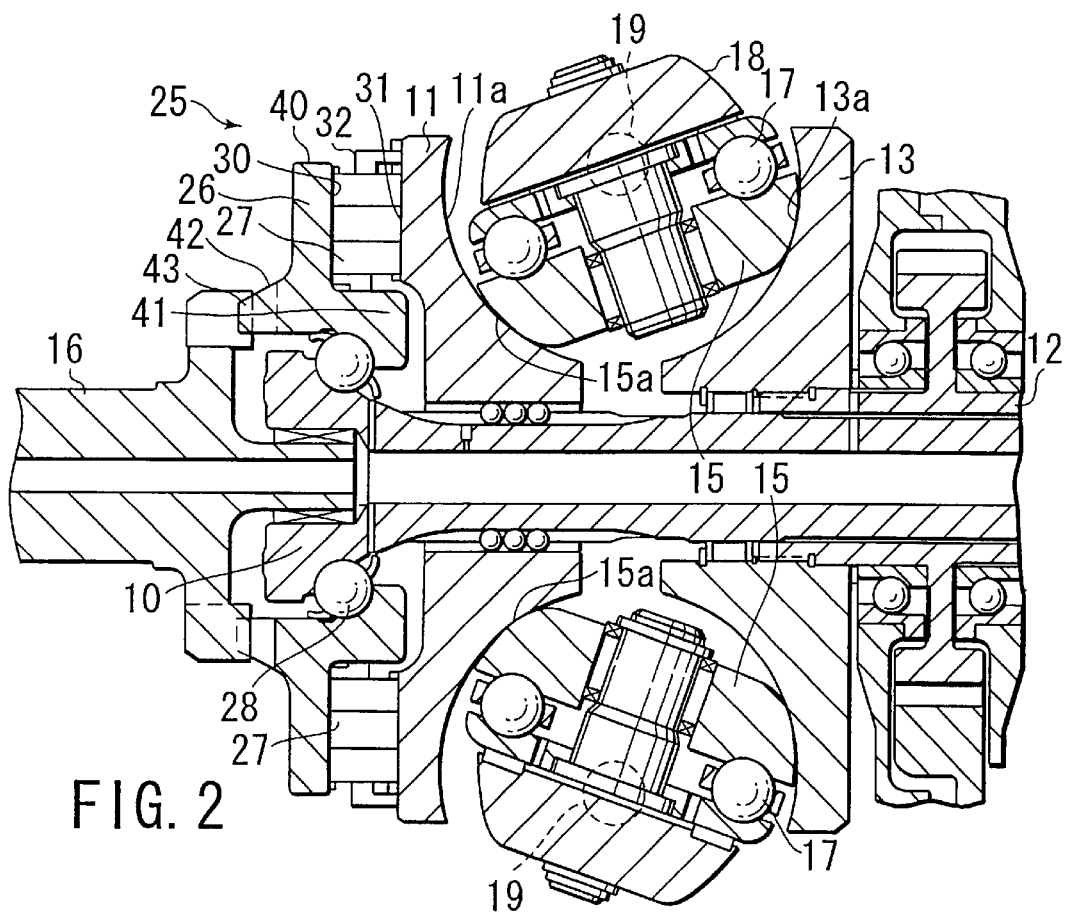
FIG. 2 is a sectional view of a part of a toroidal type continuously variable transmission provided with the cam disc shown in FIG. 1.

A half-toroidal type continuously variable transmission shown in FIG. 2 comprises an input shaft 10, an input disc 11 rotatable integrally with the input shaft 10, an output shaft 12 coaxial with the input shaft 10, an output disc 13 fixed to the output shaft 12, a pair of power rollers 15 arranged between the input and output discs 11 and 13, and the like.

An outer peripheral surface 15a of each power roller 15 is in contact with a traction surface 11a of the input disc 11 and a traction surface 13a of an output disc 13. A drive shaft 16 that is rotated by means of a drive source such as an engine is provided on the same axis as the input shaft 10. Each power roller 15 is rotatably mounted on a trunnion 18 by means of a power roller bearing 17. The trunnion 18 is rockable around a trunnion shaft 19.

A loading cam mechanism 25 is located behind the input disc 11. The mechanism 25 includes a cam disc 26 and rollers 27. The cam disc 26 is rotatably supported on the input shaft 10 by means of a ball bearing 28. Cam surfaces 30 and 31 are formed on the opposite portions the cam disc 26 and the input disc 11, respectively. The rollers 27 are sandwiched between the cam surfaces 30 and 31. The rollers 27 are held in given positions between the cam surfaces 30 and 31 by means of a retainer 32. Recesses and projections are alternately formed on the cam surfaces 30 and 31 and are arranged in the circumferential direction of the discs 26 and 11.

Figure 3A:
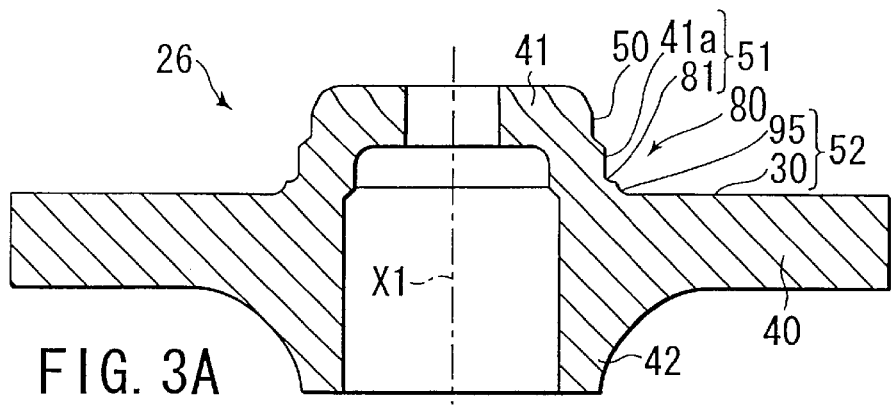
FIG. 3A is a sectional view of the cam disc shown in FIG. 1.

As shown in FIG. 3A, the cam disc 26 includes a disc portion 40 having the cam surface 30, a cylindrical portion 41 protruding from the cam surface 30 in the central portion of the disc portion 40, and a protrusion 42 projecting from the back surface of the disc portion 40. As shown in FIG. 2, the cylindrical portion 41 projects toward the input disc 11. An engaging portion 43 that engages the drive shaft 16 is formed on the protrusion 42.

If the drive shaft 16 rotates as the engine rotates, the cam disc 26 rotates, whereby the input disc 11 is pressed toward the output disc 13 by means of the rollers 27. Thereupon, the input disc 11 rotates together with the cam disc 26 with the aid of the rollers 27. When the input disc 11 rotates, its rotation is transmitted to the output disc 13 by means of the power rollers 15, so that the output shaft 12 rotates.

The cam disc 26 includes a lathe-turned portion 50 that is formed in the manufacturing process mentioned later, a milled surface 51, and a ground surface 52.

Figure 1:
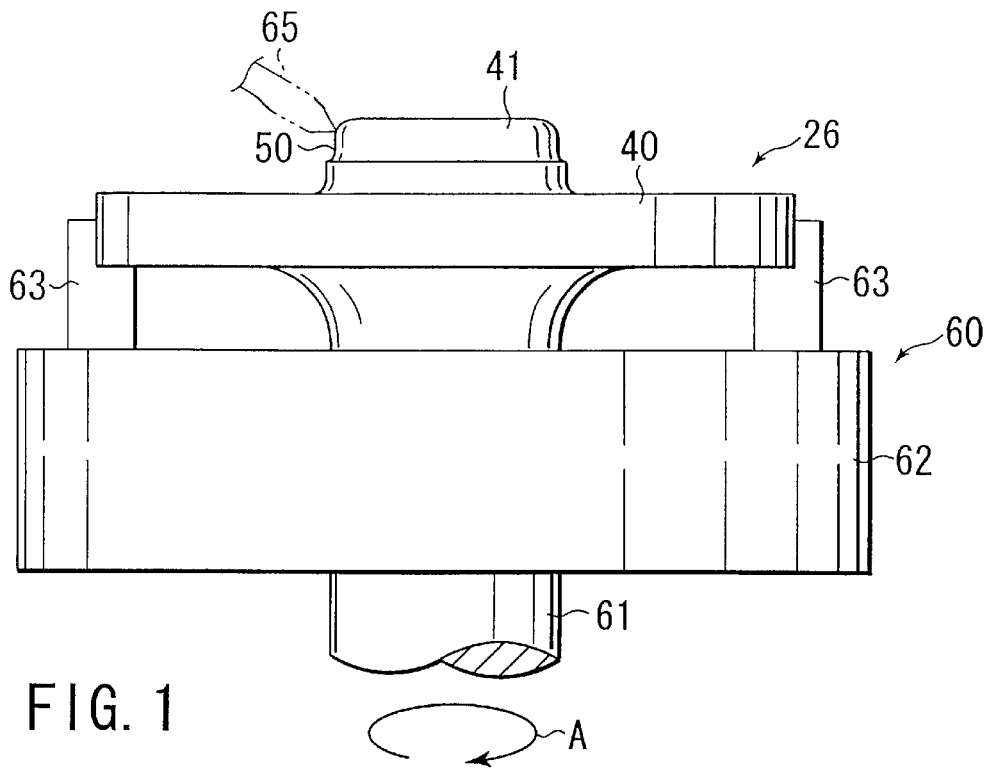
FIG. 1 is a side view showing a cam disc according to an embodiment of the present invention and a working unit therefor.

FIG. 1 shows a working unit 60 for working the cam disc 26. A chuck mechanism 62 is mounted on a spindle 61 of the working unit 60. The spindle 61 is rotatable in the direction indicated by arrow A. The chuck mechanism 62, which is constructed in the same manner as a chuck mechanism that is used in a conventional lathe, includes a plurality of chuck claws 63 for holding the cam disc 26.

First, in a lathe turning process, the spindle 61 is rotates as an end portion of the cylindrical portion 41 or the like is lathe-turned into a given shape by means of a lathe turning tool 65 such as a cutting tool shown in FIG. 1. In this lathe turning process, the lathe-turned portion 50 is formed on the cylindrical portion 41.

Figure 3B:
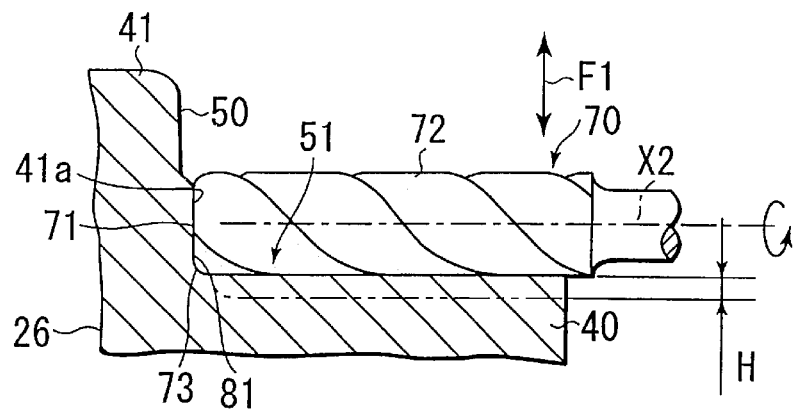
FIG. 3B is a sectional view showing a side face of a tool for milling the cam disc shown in FIG. 3A and a part of the cam disc.

Then, a milling process is carried out by means of an end mill 70 as an example of a milling tool, as shown in FIG. 3B. The end mill 70 includes a flat distal end face 71, a side face 72, and an arcuate portion 73 situated between the faces 71 and 72. In this milling process, the distal end face 71 of the end mill 70 is used to work a side face 41a of the cylindrical portion 41, while the side face 72 of the mill 70 is used to work the disc portion 40 or to pre-finish the cam surface 30.

The distal end face 71 of the end mill 70 is opposed to the side face 41a of the cylindrical portion 41 so that an axis X2 of the mill 70 extends at right angles to an axis X1 of the cylindrical portion 41. The end mill 70 is rotated around its axis X2. In this milling process, the spindle 61 is rotated as the end mill 70 is moved in the direction indicated by arrow F1 in FIG. 3B depending on the shape of the cam surface 30 to be worked, whereupon the surface 30 is worked. This milling work is referred to as cam milling herein.

In the milling process, a first corner curved surface 81 is formed on a corner portion 80 between the cylindrical portion 41 and the disc portion 40 of the cam disc 26 by means of the arcuate portion 73 of the end mill 70. The side face 41a of the cylindrical portion 41, which is worked by means of the distal end face 71 of the end mill 70, and the first corner curved surface 81 constitute a milled surface according to the present invention.

After the milling process, the cam disc 26 is heat-treated so that the harness of the cam surface 30 is enhanced.

Figure 3C:
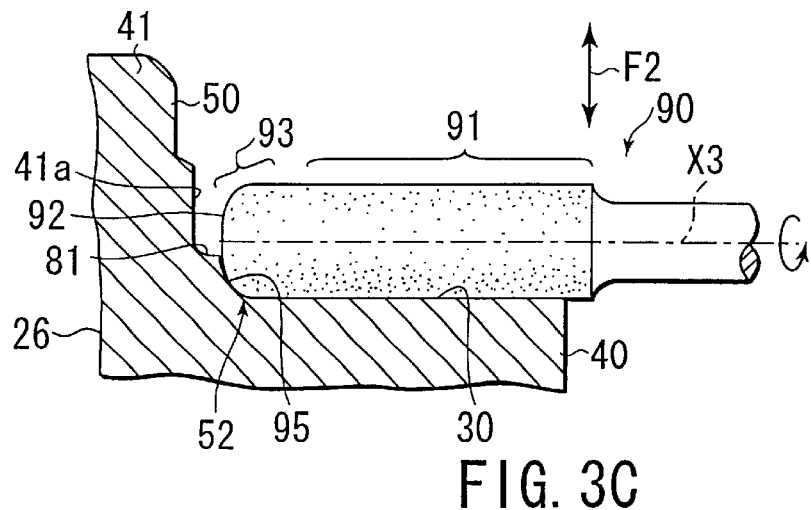
FIG. 3C is a sectional view showing a side face of a tool for grinding the cam disc shown in FIG. 3A and a part of the cam disc.
Figure 4:
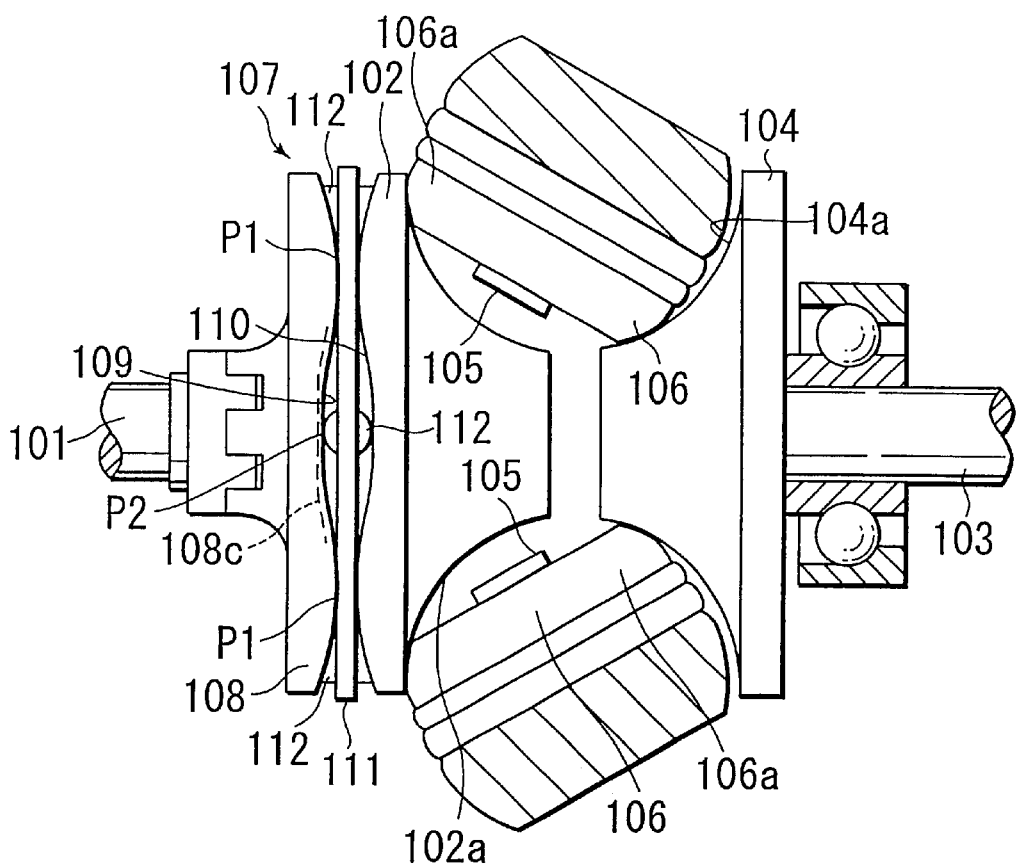
FIG. 4 is a partial side view of a conventional toroidal type continuously variable transmission provided with a loading cam mechanism.
Figure 5:
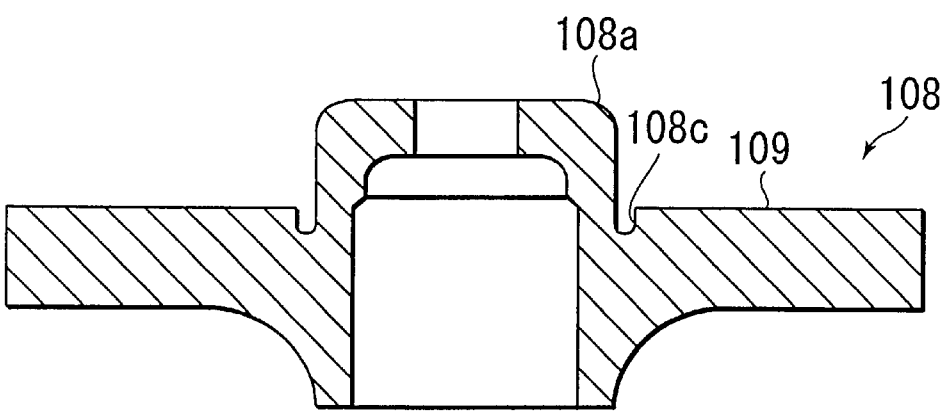
FIG. 5 is a sectional view of a conventional cam disc.

Then, in a grinding process, grinding is carried out by means of a grindstone 90, as shown in FIG. 3C. The grindstone 90 includes a straight portion 91 for working the cam surface 30, a distal end face 92, and a portion 93 having an arcuate profile. In this grinding process, the cam surface 30 is ground by means of the straight portion 91 of the grindstone 90. The grindstone 90 is opposed to the cylindrical portion 41 so that its axis X3 extends at right angles to the axis X1 of the cylindrical portion 41. The grindstone 90 is rotated around the axis X3.

In this grinding process, the spindle 61 is also rotated as the grindstone 90 is moved in the direction indicated by arrow F2 in FIG. 3C in synchronism with the rotation of the cam disc 26, depending on the shape of the cam surface 30 to be worked, whereupon the surface 30 is ground. This grinding work is referred to as cam grinding herein.

In grinding process described above, a second corner curved surface 95 is formed by means of the arcuate portion 93 of the grindstone 90. The second corner curved surface 95 is located between the first corner curved surface 81 and the cam surface 30. The second corner curved surface 95 has a radius of curvature lest the corner portion 80 be subjected to undue concentration of stress. Symbol H of FIG. 3B designates a margin for grinding of the cam surface 30 in the grinding process.

As described above, the first corner curved surface 81 is formed on the corner portion 80 between the disc portion 40 and the cylindrical portion 41 and the cam surface 30 is pre-finished by the cam milling using the end mill 70. In the grinding process, thereafter, the cam surface 30 is cam-ground by means of the grindstone 90, and the second corner curved surface 95 is formed by means of the arcuate portion 93 of the grindstone 90. Thus, the cam surface 30 can be ground without forming a conventional clearance groove for grinding that causes concentration of stress. Thus, concentration of stress on the corner portion 80 of the cam disc 26 is eased, so that the durability of the loading cam mechanism 25 is improved.

According to the cam disc 26 described herein, moreover, a process for forming a clearance groove for grinding, such as the one used in a conventional cam disc, is unnecessary. Therefore, the number of necessary processes for the manufacture of the cam disc is reduced, so that the working cost can be lowered. Since no clearance groove is formed in the cam disc, furthermore, the retainer 32 for the rollers 27 can be prevented from being caught in a clearance groove. Thus, in the loading cam mechanism 25 that uses the cam disc 26, the follow-up performance of the rollers 27 to cope with change of torque, in particular, can be improved.

The outer peripheral edge portion of the cam surface 30 can be chamfered by means of a copying chamfering unit of a simple construction that is attached to a cam milling apparatus or cam grinding apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cam disc of a loading cam mechanism of a toroidal type continuously variable transmission, which includes the cam disc rotatable together with an input shaft and rollers arranged between a cam surface of the cam disc and an input disc, the cam disc comprising a disc portion having the cam surface formed thereon and a cylindrical portion protruding from the cam surface in the central portion of the disc portion, the cam disc further comprising:

a lathe-turned portion formed on at least a part of the cylindrical portion by lathe turning;

a milled surface formed on a side face of the cylindrical portion by milling; and a ground surface including the cam surface and a corner curved surface with an arcuate profile formed on a corner portion between the cylindrical portion and the disc portion by grinding.

2. A cam disc according to claim 1, which further comprises a first corner curved surface with an arcuate profile constituting a part of the milled surface and a second corner curved surface with an arcuate profile constituting a part of the ground surface, formed between the first corner curved surface and the cam surface, and having a radius of curvature not smaller than a given value.

3. A manufacturing method for a cam disc of a loading cam mechanism of a toroidal type continuously variable transmission, the cam disc including a disc portion having a cam surface and a cylindrical portion protruding from the cam surface in the central portion of the disc portion, the cam disc manufacturing method comprising:

a lathe turning process for lathe-turning at least an end portion of the cylindrical portion;

a milling process for working a side face of the cylindrical portion and pre-finishing the cam surface by means of a milling tool, and further forming a first corner curved surface on a corner portion between the cylindrical portion and the disc portion by means of the milling tool, the milling process directly following the lathe turning process; and a grinding process for grinding the cam surface of the disc portion by means of a grindstone so that the first corner curved surface remains and forming a second corner curved surface between the first corner curved surface and the cam surface by means of the grindstone, the grinding process directly following the milling process.

4. A cam disc manufacturing method according to claim 3, wherein said milling process is carried out by means of an end mill having an arcuate portion on the distal end portion thereof for working the first corner curved surface.

5. A cam disc manufacturing method according to claim 3, wherein said grinding process is carried out by means of a grindstone having a straight portion for grinding the cam surface and an arcuate portion on the distal end portion thereof for grinding the second corner curved surface.

\* \* \* \* \*